(12) United States Patent  
Liao

(10) Patent No.: US 8,555,100 B2  
(45) Date of Patent: Oct. 8, 2013

(54) SELECTIVE LOW POWER MANAGEMENT PRIORITIZATION IN A MOBILE DEVICE

(75) Inventor: Robert H. Liao, Chestnut Hill, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 879 days.

(21) Appl. No.: 12/331,653

(22) Filed: Dec. 10, 2008

(65) Prior Publication Data

US 2010/0146312 A1  Jun. 10, 2010

(51) Int. Cl.
   *G06F 1/00*  (2006.01)
   *G06F 1/32*  (2006.01)

(52) U.S. Cl.
   CPC ............................ *G06F 1/3203* (2013.01)
   USPC .......................................... 713/324; 713/323

(58) Field of Classification Search
   USPC ............ 713/300–340; 455/552.1–574, 426.1; 717/170–172
   See application file for complete search history.

(56) References Cited

U.S. PATENT DOCUMENTS

| | | | | |
|---|---|---|---|---|
| 5,870,673 A * | 2/1999 | Haartsen | ..................... | 455/426.1 |
| 6,002,918 A * | 12/1999 | Heiman et al. | ................ | 340/7.38 |
| 6,112,269 A * | 8/2000 | Nordling | .......................... | 710/69 |
| 6,236,326 B1 * | 5/2001 | Murphy | ..................... | 340/636.1 |
| 6,345,180 B1 * | 2/2002 | Reichelt | ..................... | 455/404.1 |
| 7,099,693 B2 * | 8/2006 | Shin | ..................... | 455/557 |
| 7,305,259 B1 * | 12/2007 | Malone et al. | ................ | 455/574 |
| 7,321,975 B2 * | 1/2008 | Park et al. | ..................... | 713/324 |
| 7,600,139 B2 * | 10/2009 | Ang | ..................... | 713/320 |
| 7,657,273 B2 * | 2/2010 | Haartsen | ..................... | 455/522 |
| 7,730,479 B2 * | 6/2010 | Nishida | ..................... | 717/172 |
| 7,902,839 B2 * | 3/2011 | Sato | ..................... | 324/663 |
| 7,912,518 B2 * | 3/2011 | Uh et al. | ..................... | 455/574 |
| 2002/0106997 A1 * | 8/2002 | Barber et al. | ................ | 455/343 |
| 2005/0208966 A1 * | 9/2005 | David et al. | ................ | 455/553.1 |
| 2007/0118426 A1 | 5/2007 | Barnes, Jr. | | |
| 2007/0140199 A1 * | 6/2007 | Zhao et al. | ..................... | 370/338 |
| 2008/0058003 A1 * | 3/2008 | Rydnell et al. | ............. | 455/552.1 |
| 2008/0133956 A1 | 6/2008 | Fadell | | |
| 2008/0146292 A1 * | 6/2008 | Gilmore et al. | ................ | 455/572 |
| 2010/0061431 A1 * | 3/2010 | Jyrkka et al. | ................. | 375/220 |
| 2010/0227651 A1 * | 9/2010 | Kim | ............................... | 455/566 |

FOREIGN PATENT DOCUMENTS

| | | |
|---|---|---|
| CN | 1677352 | 10/2005 |
| TW | 200839500 | 10/2008 |

* cited by examiner

*Primary Examiner* — Raymond Phan

(57) ABSTRACT

A device may include an output device to provide information to a user. The device may further include logic configured to receive an input that identifies an activity to enable while in a low power condition, monitor a power condition of the device, determine that the power condition is the low power condition, and deactivate or disable activities other than the identified activity when the power condition is the low power condition.

20 Claims, 7 Drawing Sheets

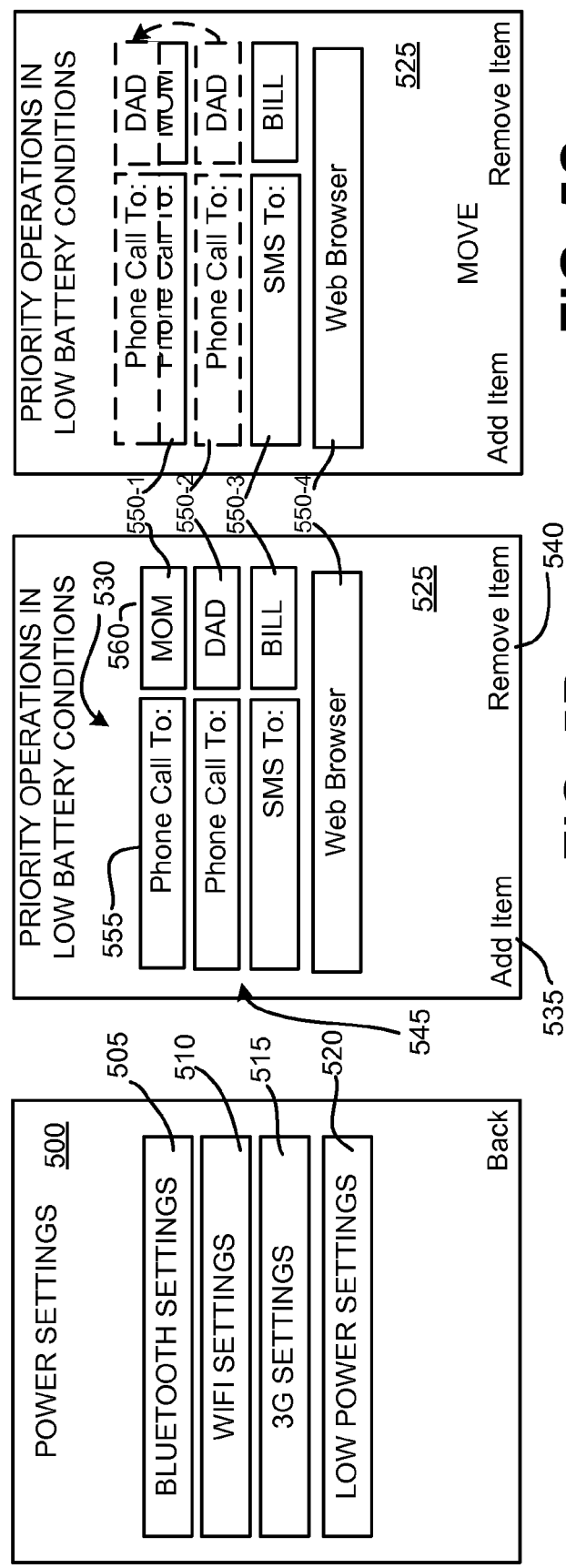

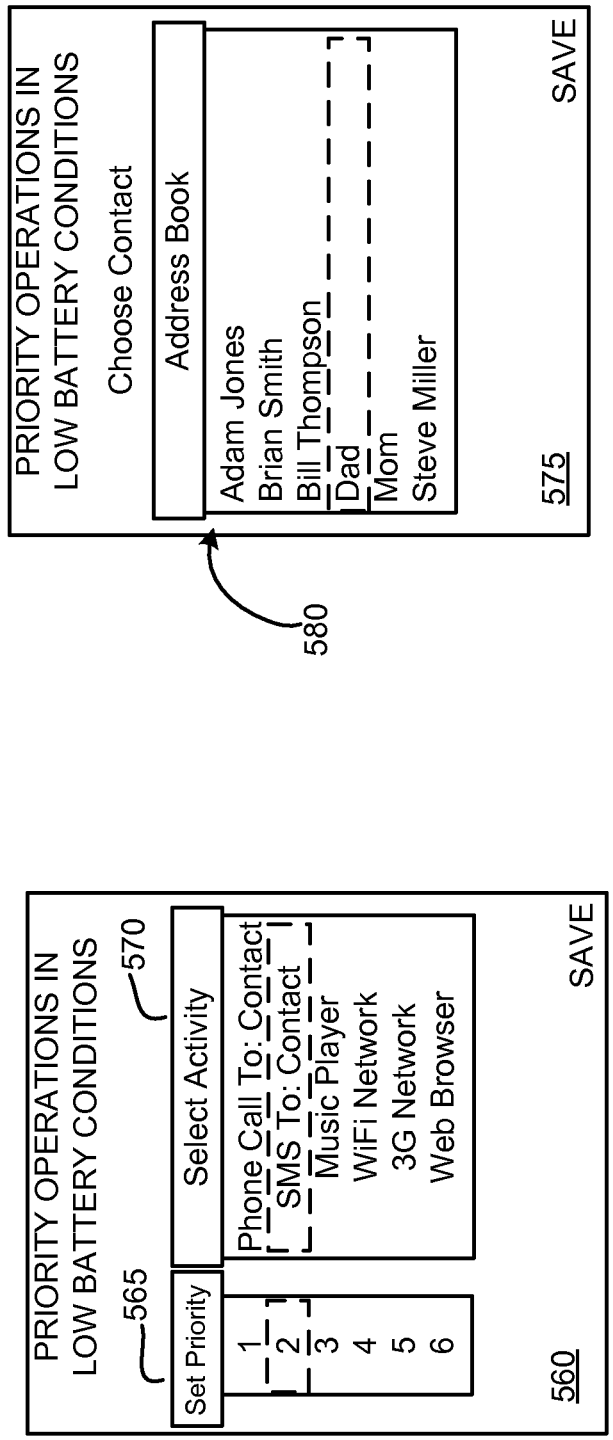

SELECTIVE LOW POWER MANAGEMENT PRIORITIZATION IN A MOBILE DEVICE

BACKGROUND INFORMATION

Users of portable electronics devices, such as mobile phones, personal digital assistants (PDAs), portable gaming devices, etc., have increasingly relied upon these devices for various functions, ranging from telecommunications (e.g., phone calls, emails, text messages, etc.) to telling the time of day. Unfortunately, the mobile nature of these devices makes their utility dependent upon the battery power available to each device. When the battery becomes exhausted, all functionality of the device is unavailable.

BRIEF DESCRIPTION OF THE DRAWINGS

FIGS. 5A-5E are diagrams illustrating exemplary user interfaces for receiving and/or modifying prioritized activities or events in the user device of FIGS. 1-3.

DETAILED DESCRIPTION OF PREFERRED EMBODIMENTS

The following detailed description refers to the accompanying drawings. The same reference numbers in different drawings may identify the same or similar elements. Also, the following detailed description does not limit the embodiments disclosed herein.

Implementations described herein relate to a device, method, and system for enabling prioritization of executing functions on a mobile device, in the event of a reduction in available power, e.g., from a battery or other finite power source. In some implementations, a mobile telephone or other portable electronics device may include a portable power supply, such as a rechargeable battery. Logic associated with the device may be configured to receive identification or selection of at least one prioritized activity from a user. Logic associated with the device may be further configured to monitor power available to the device and to restrict and/or curtail activities on the device, while maintaining the availability of the prioritized activity. In other implementations, an interface may be provided for selecting the prioritized activity and/or modifying the selection.

Figure 1:
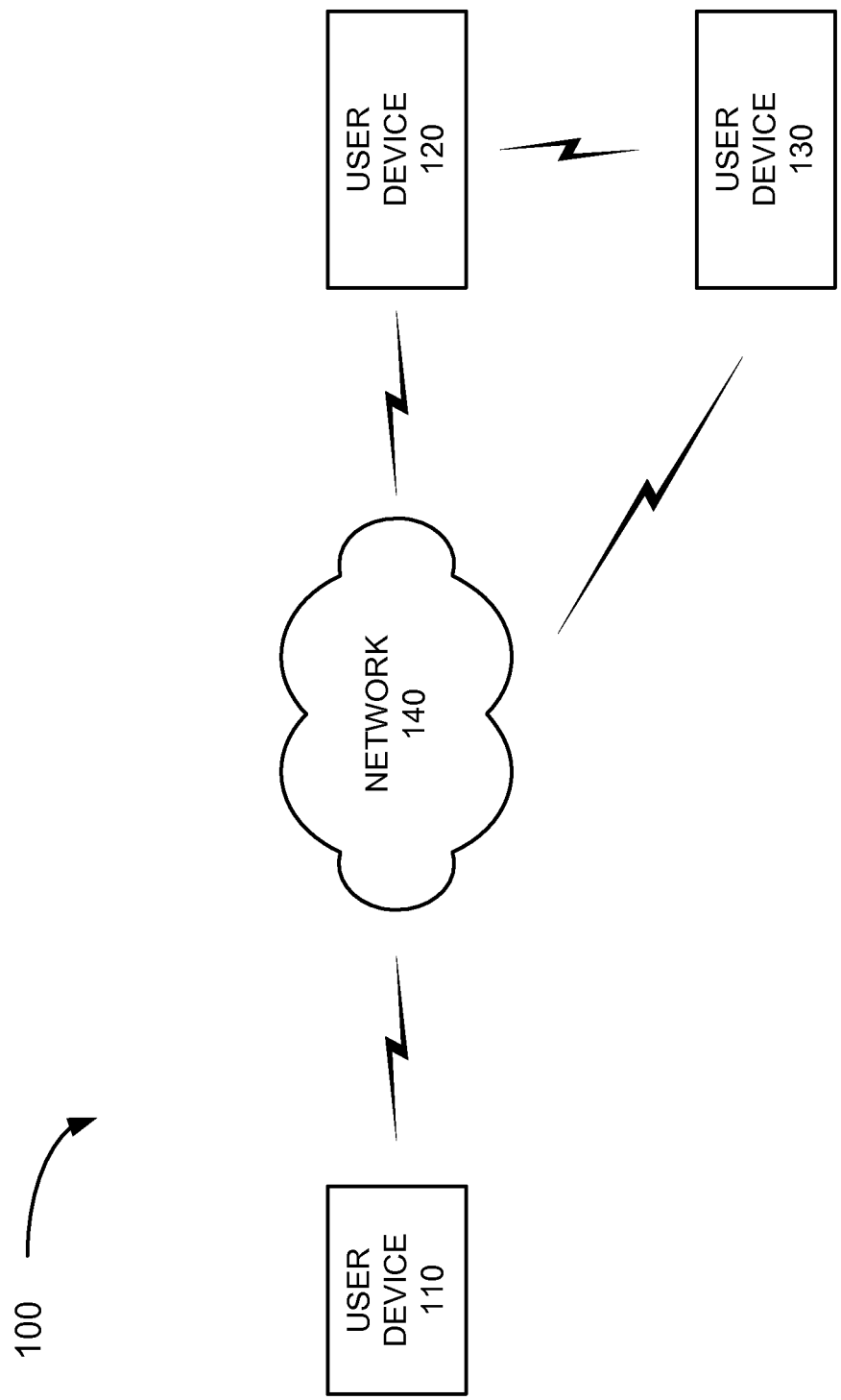
FIG. 1 illustrates an exemplary system in which systems and methods described herein may be implemented.

FIG. 1 is a block diagram of an exemplary network 100 in which systems and methods described herein may be implemented. Network 100 may include user device 110, user device 120, user device 130 and network 140. User devices 110-130 may connect to network 140 and/or each other via wired, wireless or optical communication mechanisms.

Each of user devices 110-130 may include a cellular radiotelephone, personal digital assistant (PDA) or pager with data communications and/or data processing capabilities. For example, user devices 110-130 may each include a cellular telephone, a PDA, a web-based appliance or pager that includes a Web browser or other application providing Internet/Intranet access, messaging application programs, such as text messaging, multi-media messaging, instant messaging, e-mail, etc., an organizer application program, a calendar application program and/or a global positioning system (GPS) receiver. In an alternative implementation, one or more of user devices 110-130 may include a personal computer (PC), laptop computer, palmtop receiver, remote control device and/or any other appliance that may include a radio-telephone transceiver and other applications for providing data processing and data communication functionality.

In another implementation, one or more of user devices 110-130 may include various user equipment, such as a video game system, a television, a video cassette recorder (VCR), a Digital Video/Versatile Disk (DVD) player, a Compact Disk (CD) player, etc., that may be controlled by or interact with other ones of user devices 110-130.

Network 140 may include one or more wired, wireless and/or optical networks that are capable of receiving and transmitting data, voice and/or video signals, including multimedia signals that include voice, data and video information. For example, network 140 may include one or more public switched telephone networks (PSTNs) or another type of switched network. Network 140 may also include one or more wireless networks and may include a number of transmission towers for receiving wireless signals and forwarding the wireless signals toward the intended destination. Network 140 may further include one or more packet switched networks, such as an Internet protocol (IP) based network, a local area network (LAN), a wide area network (WAN), a personal area network (PAN), an intranet, the Internet, or another type of network that is capable of transmitting data.

The exemplary configuration illustrated in FIG. 1 is provided for simplicity. It should be understood that a typical network may include more or fewer devices than those illustrated in FIG. 1. For example, other devices that facilitate communications between the various entities illustrated in FIG. 1 may also be included in network 100. In addition, user devices 110-130 are each shown as separate elements. In other instances, the functions described as being performed by two or more user devices may be performed by a single user device. For example, in some instances, user device 110 may be a game controller and user device 130 may be a game console, while in other instances, these devices may be integrally formed as a single user device. In other implementations, the functions described as being performed by one user device may be performed by another user device or by multiple user devices.

Figure 2:
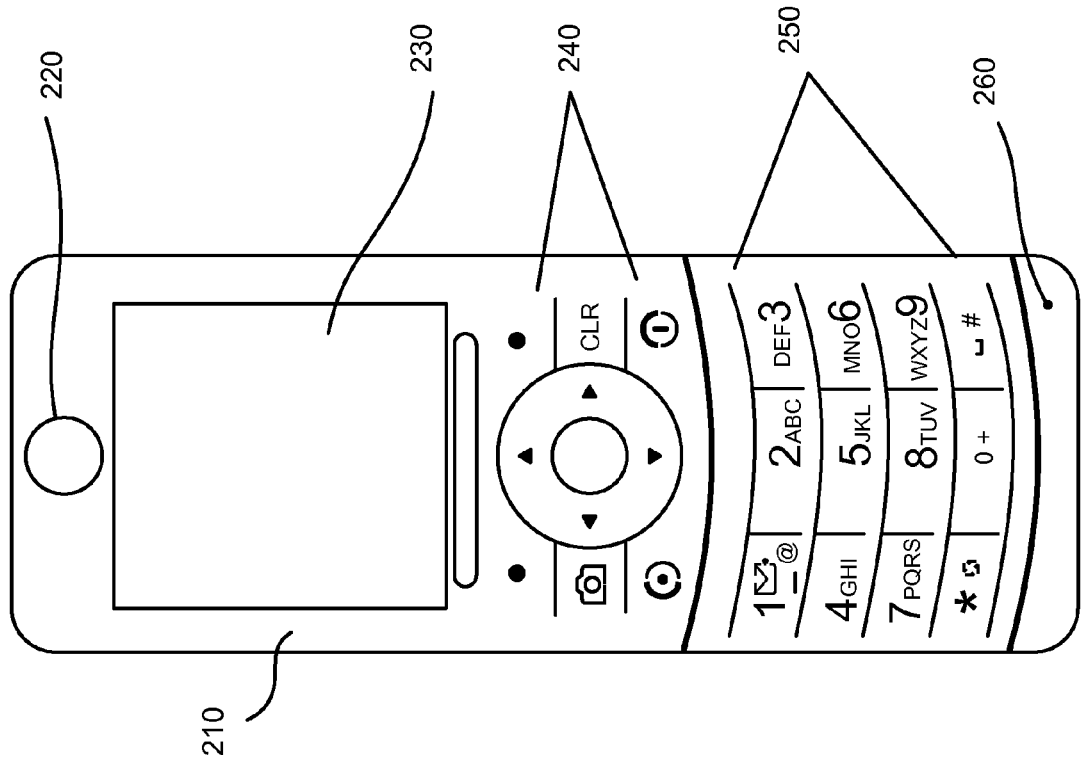
FIG. 2 is a diagram of an exemplary user device of FIG. 1.

FIG. 2 is a diagram of an exemplary user device 110 in which methods and systems described herein may be implemented. Referring to FIG. 2, user device 110 may include a housing 210, speaker 220, display 230, control buttons 240, keypad 250, and microphone 260. Housing 210 may protect the components of user device 110 from outside elements. Speaker 220 may provide audible information to a user of user device 110. For example, speaker 220 may provide ringtones, beeping sounds or other sounds to alert the user to an event. Speaker 220 may also output audio information or instructions to a user of user device 110.

Display 230 may provide visual information to the user. For example, display 230 may include a liquid crystal display (LCD), a touch screen display or another type of display used to provide information to a user, such information regarding incoming or outgoing telephone calls and/or incoming or outgoing electronic mail (email), instant messages (e.g., mobile instant messages (MIMs), short message service (SMS) messages, multi-media message service (MMS) messages, etc. Display 230 may also display information regarding various applications, such as a calendar application or text message application stored in user device 110, the current time, video games being played by a user, downloaded content (e.g., news or other information), etc.

Control buttons 240 may permit the user to interact with user device 110 to cause user device 110 to perform one or more operations, such as sending communications (e.g., text messages or multi-media messages), placing a telephone call, playing various media, etc. For example, control buttons 240 may include a send button, an answer button, a dial button, a hang up button, a clear button, a play button, etc. In an exemplary implementation, control buttons 240 may also include one or more buttons that may be used to launch an application program, such as a messaging program. Further, one of control buttons 240 may be a menu button that permits the user to view options associated with executing various application programs, such as messaging programs, stored in user device 110.

Keypad 250 may include a telephone keypad. As illustrated, many of the keys on keypad 250 may include numeric values and various letters to user device 110. For example, the key with the number 2 includes the letters A, B and C. These letters may be selected by a user when inputting text to user device 110. Other keys on keypad 250 may include symbols, such as the star symbol (i.e., *), the pound symbol (i.e., #), the at symbol (i.e., @), etc. These symbols may be input to user device 110 used to perform various functions, as described in detail below. Microphone 260 may receive audible information from the user.

Figure 3:
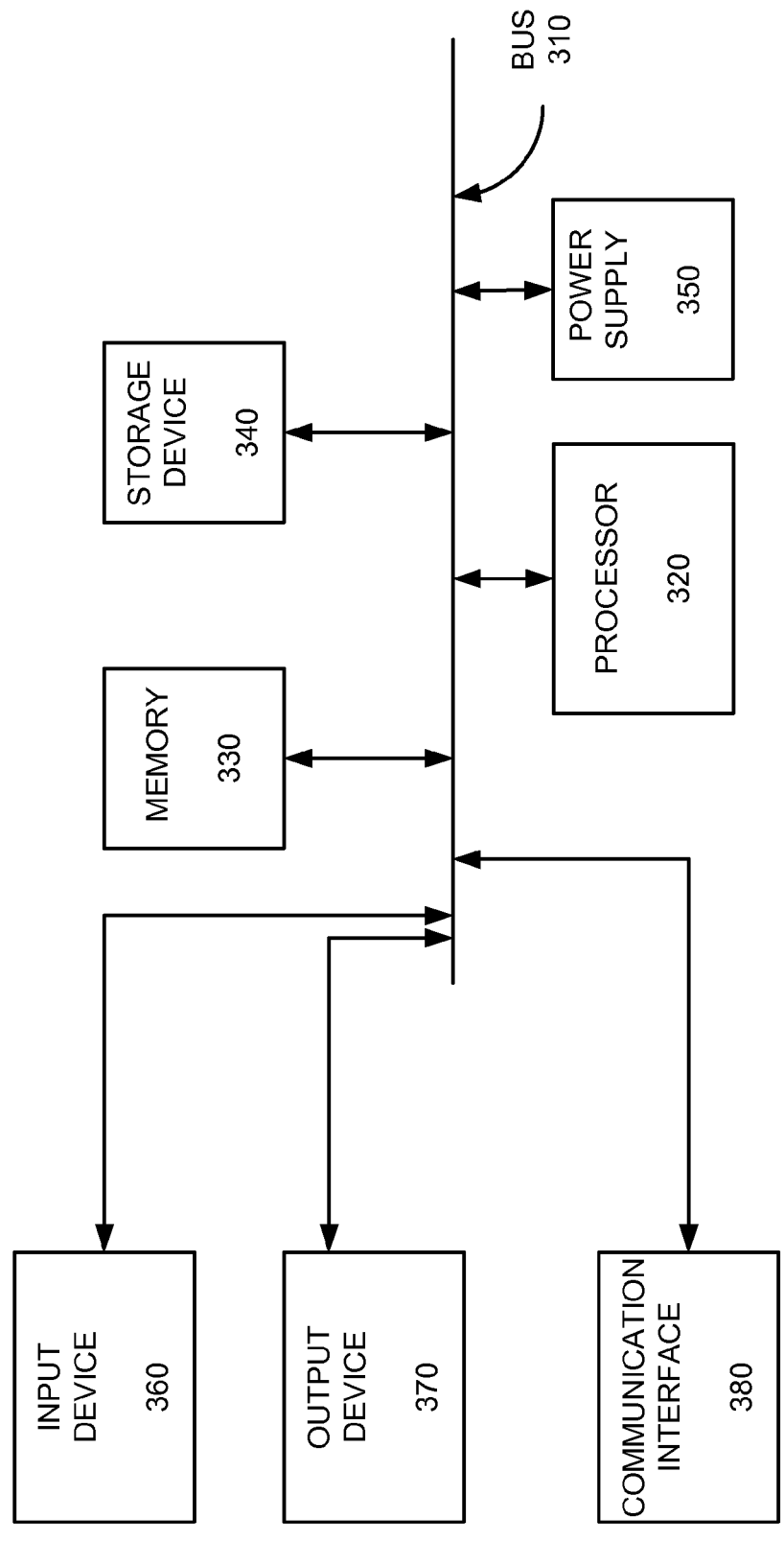
FIG. 3 is a diagram illustrating exemplary components of the user device of FIG. 2.

FIG. 3 is a diagram illustrating components of user device 110 according to an exemplary implementation. In some implementations, user devices 120 and 130 may be configured in a similar manner. Referring to FIG. 3, user device 110 may include a bus 310, processor 320, memory 330, storage device 340, power supply 350, input device 360, output device 370, and communication interface 380. Bus 310 may include a path that permits communication among the elements of user device 110. It should be understood that user device 110 may be configured in a number of other ways and may include other or different elements. For example, user device 110 may include one or more modulators, demodulators, encoders, decoders, etc., for processing data.

Processor 320 may include one or more processors, microprocessors, application specific integrated circuits (ASICs), field programmable gate arrays (FPGAs), or other processing logic that may interpret and execute instructions. Memory 330 may include a random access memory (RAM) or another type of dynamic or static memory device that may store information and instructions for execution by processor 320. Storage device 340 may include a magnetic and/or optical recording medium and its corresponding drive. Power supply 350 may include a battery or other power source used to power user device 110.

Input device 360 may include one or more mechanisms that permit a user to input information to user device 110, such as control keys 240, keypad 250, microphone 260, a touch screen, such as display 230, a mouse, a pen, voice recognition and/or biometric mechanisms, etc.

Output device 370 may include one or more mechanisms that output information to the user, including a display, such as display 230, a printer, one or more speakers, such as speaker 220, a vibrating mechanism that provides haptic feedback to a user, etc.

Communication interface 380 may include any transceiver-like mechanism that enables user device 110 to communicate with other devices and/or systems. For example, communication interface 380 may include mechanisms for communicating via a network, such as a wireless network. In these implementations, communication interface 380 may include one or more radio frequency (RF) transmitters, receivers and/or transceivers and one or more antennas for transmitting and receiving RF data via a network. Communication interface 380 may also include an infrared (IR) transmitter and receiver and/or transceiver that enable user device 110 to communicate with other devices via infrared (IR) signals. Communication interface 380 may also include a modem or an Ethernet interface to a LAN or other network for communicating with other devices in system 100. In yet other implementations, communication interface 380 may be configured to include one or more short-range wireless technologies, such as radio frequency identifiers (RFID), Bluetooth®, or near field communication (NFC). Such technologies may provide for the exchange of data between devices in close physical proximity to each other in either an active or passive manner. Communication interface 380 may include other mechanisms for communicating with other devices 110 or via a network.

Such a network may include one or more wired, wireless and/or optical networks that are capable of receiving and transmitting data, voice and/or video signals, including multimedia signals that include voice, data and video information. For example, a network suitable for use with user device 110 may include one or more public switched telephone networks (PSTNs) or other type of switched network. The network may also include one or more wireless networks and may include a number of transmission towers for receiving wireless signals and forwarding the wireless signals toward the intended destination. The network may further include one or more packet switched networks, such as an Internet protocol (IP) based network, a local area network (LAN), a wide area network (WAN), a personal area network (PAN), an intranet, the Internet, or another type of network that is capable of transmitting data.

In some implementations consistent with embodiments described herein, user device 110 may provide a platform for enabling a user to make and receive telephone calls, send and receive electronic mail, text messages, instant messages (IMs), mobile IMs (MIMs), short message service (SMS) messages, etc., and execute various other applications. User device 110, as described in detail below, may also perform processing associated with tracking social interactions associated with device 110 (e.g., between a user of device 110 and identified locations and/or other devices). User device 110 may perform these operations in response to processor 320 executing sequences of instructions contained in a computer-readable medium, such as memory 330. A computer-readable medium may be defined as a physical or logical memory device. The software instructions may be read into memory 330 from another computer-readable medium, such as data storage device 340, or from another device via communication interface 380. The software instructions contained in memory 330 may cause processor 320 to perform processes that will be described later. Alternatively, hard-wired circuitry may be used in place of or in combination with software instructions to implement processes consistent with the embodiments described herein. Thus, implementations described herein are not limited to any specific combination of hardware circuitry and software.

Figure 4:
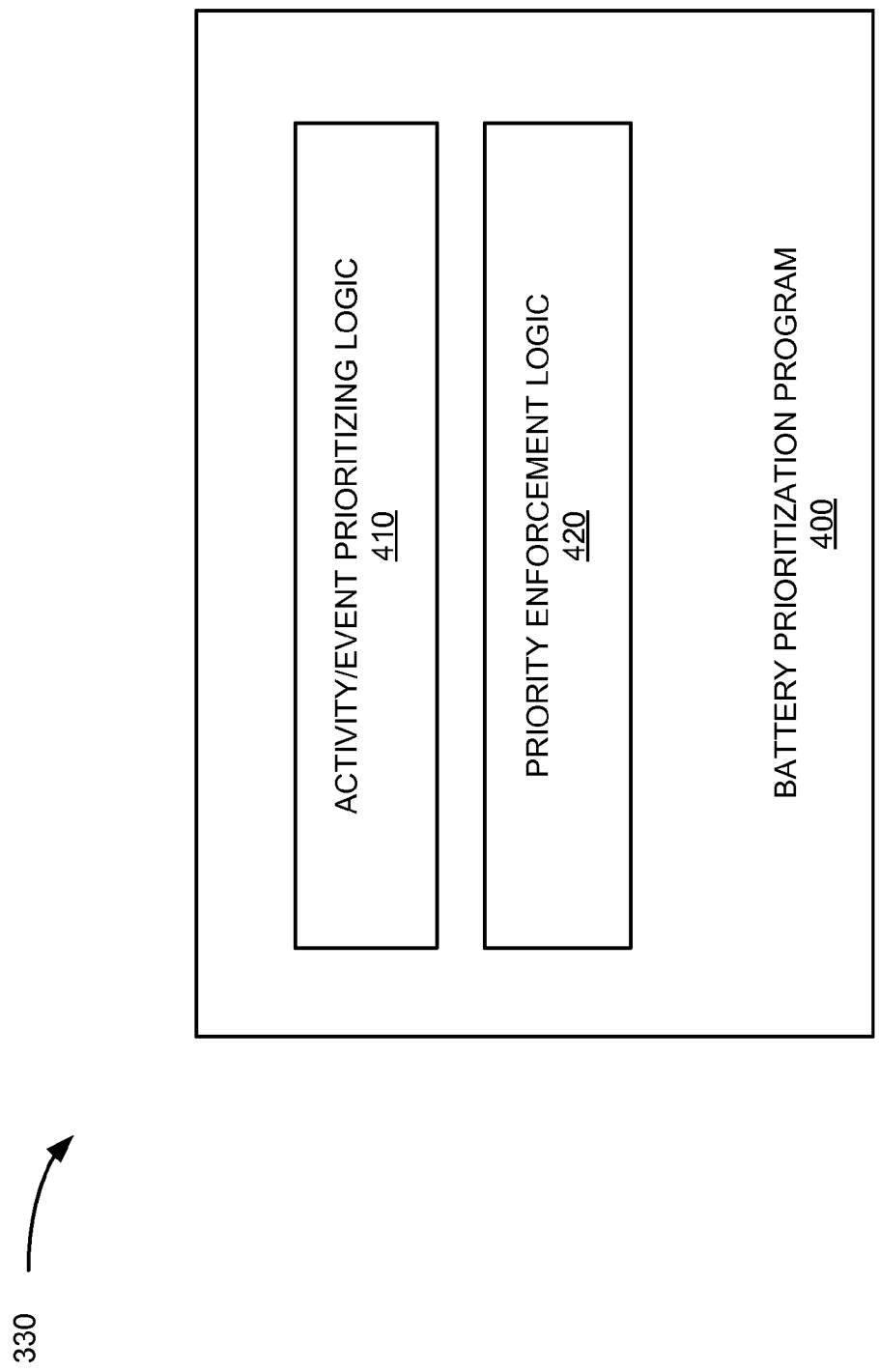
FIG. 4 is an exemplary functional block diagram of components implemented in the user device of FIGS. 1-3.

FIG. 4 is an exemplary functional block diagram of components implemented in user devices 110-130 of FIG. 2, such as, by processor 320 executing a program stored in memory 330. The logical blocks illustrated in FIG. 4 may be implemented in software, hardware, or a combination of hardware and software. For the purposes of simplicity, the following description will be made with respect to user device 110.

However, it should be understood that user devices 120 and 130 may include substantially similar components.

Referring to FIG. 4, memory 330 may include a battery prioritization program 400 executable by processor 320. As discussed in detail below, battery prioritization program 400 may be configured to enable user device 110 to receive identification of at least one prioritized activity and to monitor available battery power to ensure that enough power remains to perform the prioritized activity. As illustrated, battery prioritization program 400 may include activity/event prioritizing logic 410 and priority enforcement logic 420. Battery prioritization program 400 and its various logic components are shown in FIG. 4 as being included in user device 110. In alternative implementations, these components or a portion of these components may be located externally with respect to user device 110. For example, in some implementations, one or more of the components of battery prioritization program 400 may be located in or executed by a remote network device. For example, identification of the prioritized activity may be received via a remote network device, such as a web server associated with a service provider affiliated with user device 110.

Activity/event prioritizing logic 410 may include logic to receive an identification or selection of one or more activities or events to be prioritized in a low or reduced power condition associated with user device 110. For example, activity/event prioritizing logic 410 may provide, e.g., via output device 370, a user interface for enabling a user to select and/or input one or more events for low power prioritization. In one implementation, the number of low power prioritization activities or events may be restricted to a single activity or event. In other implementations, the user interface may enable users to select and/or input multiple activities or events, for example, in a ranked or prioritized listing. In one implementation, activity/event prioritizing logic 410 may receive a user selection of a telephone call to contact "Mom" as a highest priority activity in a low power condition.

Priority enforcement logic 420 may include logic to monitor a power condition associated with user device 110 and to implement power saving rules for user device 110 based on the activities and/or events identified by activity/event prioritizing logic 410 while user device 110 is in a low power condition. For example, priority enforcement logic 420 may identify an amount of power available to user device 110 and may deactivate one or more features or activities in user device 110. The deactivated features or activities may not conflict with the activities and/or events identified by activity/event prioritizing logic 410. Using the example provided above, user device 110 may deactivate a number of features or activities such that their deactivation does not conflict with a telephone call to contact "Mom." Such features or activities may include Bluetooth, Wi-Fi, 3G network access, web browsing capabilities, music or media playing capabilities, maximum screen brightness, etc. By limiting or prohibiting access to such non-prioritized activities, user device 110 may be able to ensure that access to the prioritized activities are provided while device 110 is in the low power condition.

In one implementation, deactivation of the features of user device 110 may be performed based on a predetermined schedule. For example, those features or activities requiring a relatively large amount of power, such as Bluetooth or Wi-Fi access, may be the first ones to be eliminated, with other activities, such as placing calls or exchanging SMS messages to non-prioritized contacts may be the last activities to be prohibited.

Furthermore, in one implementation, the elimination of features in connection with the low power condition may be made transparent to a user of device 110. For example, a user may not be notified of the deactivation of a feature, unless the feature is requested or selected by the user. Upon selection of an unavailable feature, the user may be notified that that feature is unavailable in a low power condition.

In an alternative implementation, a user interface, such as a gauge or dial may be provided to notify the user of the power condition of device 101 and its effect on various user activities. For example, the gauge may indicate that when a power level falls below a certain point, Wi-Fi and Bluetooth access will be disabled or prevented.

In one implementation, activities or events identified or selected as prioritized events may be subject to deactivation or disabling upon continued reduction in available power. For example, the order in which the events are provided in a listing of prioritized events may denote the relative priority in which the designated events are to be enabled during a lower power condition. For example, upon initial entry of a low power condition by user device 110, all of the activities designated in the listing may be supported, while other activities not listed may be suspended or prevented. As the amount of power continues to wane, support of the activities may be removed in the order opposite to that of the listing, with a final activity to be eliminated being the highest priority activity in the listing.

FIGS. 5A-5E are diagrams illustrating exemplary user interfaces for prioritizing activities or events in user device 110. FIG. 5A depicts a user interface 500 for setting a number of power-related options via, e.g., output device 370. As shown, user interface 500 may include a Bluetooth settings option 505, a Wi-Fi settings option 510, a 3G settings option 515, and a low power settings option 520.

User selection of Bluetooth settings option 505, Wi-Fi settings option 510, and/or 3G settings option 515 may result in the user being provided with appropriate interfaces corresponding to the selected option (not shown).

FIG. 5B depicts a user interface 525 provided in response to a user selection of low power settings option 520. As shown user interface 525 may include a current low power priority listing section 530, an add item option 535, and a remove item option 540. Current low power priority listing section 530 may include a listing 545 of previously selected and ranked/prioritized activities or events. For example, as shown in FIG. 5B, the listing of previously selected and ranked activities or events may include entries 550-1 to 550-4 corresponding to previously selected activities or events for low power operation. Each of entries 550-1 through 550-4 may include an indication as to the type of activity or event 555 as well as a contact identifier 560 associated with the corresponding activity or event.

For example, current low power priority listing section 530 may include an entry 550-1 that designates a phone call 555 to "Mom" 560. Furthermore, in reference to its position in listing 545, entry 550-1 may be given the maximum priority in low power conditions. This means that, in the event that a low power condition exists on device 110, other activities may be suspended or prevented to ensure that enough power remains to execute the activity indicated in entry 550-1 for at least a predetermined amount of time. For a phone call, the predetermined amount of time may include 5 minutes. For SMS messages, the predetermined amount of time may include enough time to send or receive 5 text messages. For a web browsing session, the predetermined amount of time may include approximate 5 minutes.

In addition to entry 550-1, low power activity listing 545 may include entry 550-2 that designates a phone call to "Dad," entry 550-3 that designates an SMS message to "Bill,"

and entry 550-4 that designates a web browsing session. In one implementation consistent with embodiments described herein, the order in which the events or activities are provided in listing 545 may denote the relative priority in which the designated events may be provided. For example, upon initial entry of a low power condition by user device 110, all of the activities designated in listing 545 may be supported, while other activities not listed may be suspended or prevented. As the amount of power continues to wane, support of the activities on listing 545 may be removed in the order opposite to that of listing 545, with a final activity to be eliminated being first entry 550-1 in listing 545.

In one implementation, the order in which the activities are provided on listing 545 may be modified after initial entry in the list. FIG. 5C illustrates one implementation for effecting such a modification. As shown, an entry in listing 545 (e.g., entry 550-2) may be highlighted or otherwise selected for modification. Upon selection, the selected entry (e.g., 550-2) may be moved up or down in listing 545 to reflect a modified priority. In the example of FIG. 5C, entry 550-2 is moved above entry 550-1. In one implementation, movement of entry 550-2 may be facilitated by pressing of a suitable control key 240 or combination of control keys 240. In other implementations, movement of entry 550-2 may be facilitated via a touch screen interface, etc. Upon movement of the selected entry, user interface 525 may display the updated listing 545 of entries 550.

Returning to FIG. 5B, selection of remove item option 540 may result in the removal of a selected entry from listing 545. Selection of add item option 535 may be used to enable entry of a new activity or event into listing 545. In one implementation, add item option 535 may be selected via one of control keys 240. Alternatively, add item option 535 may be selected via alternate means, such as via a touch screen display. FIG. 5D depicts a user interface 560 provided in response to a user selection of low power settings option 520. As illustrated, user interface 560 may include a priority selection section 565 and an activity selection section 570.

Priority selection section 565 may be used to enable the user to select an initial priority associated with an added activity. In one implementation, the available priorities may be provided in a listed format, one of which is selected or highlighted via manipulation of control keys 240 or via a touch screen interface.

Activity selection section 570 may include a listing of activities or events available for low power priority selection. As shown, such activities or events may include phone calls, SMS messaging, using a music player, communicating via a Wi-Fi network, 3G network, Web browser, etc. Where appropriate, selection of one of the available activities or events may cause or lead to an addition of another, related activity. For example, selection of the phone call or SMS message activity may result in display of a user interface, such as user interface 575 depicted in FIG. 5E, for receiving a user selection of a contact with whom the phone call or SMS messaging is to be enabled.

As shown in FIG. 5E, user interface 575 may include an address book section 580 for enabling the user of device 110 to select a contact for association with the activity or event selected in interface 560. In one implementation, activity/event prioritizing logic 410 may interface with an address book application associated with device 110 to enable selection of a contact from the address book application without requiring the user to enter information for a selected contact.

Figure 6:
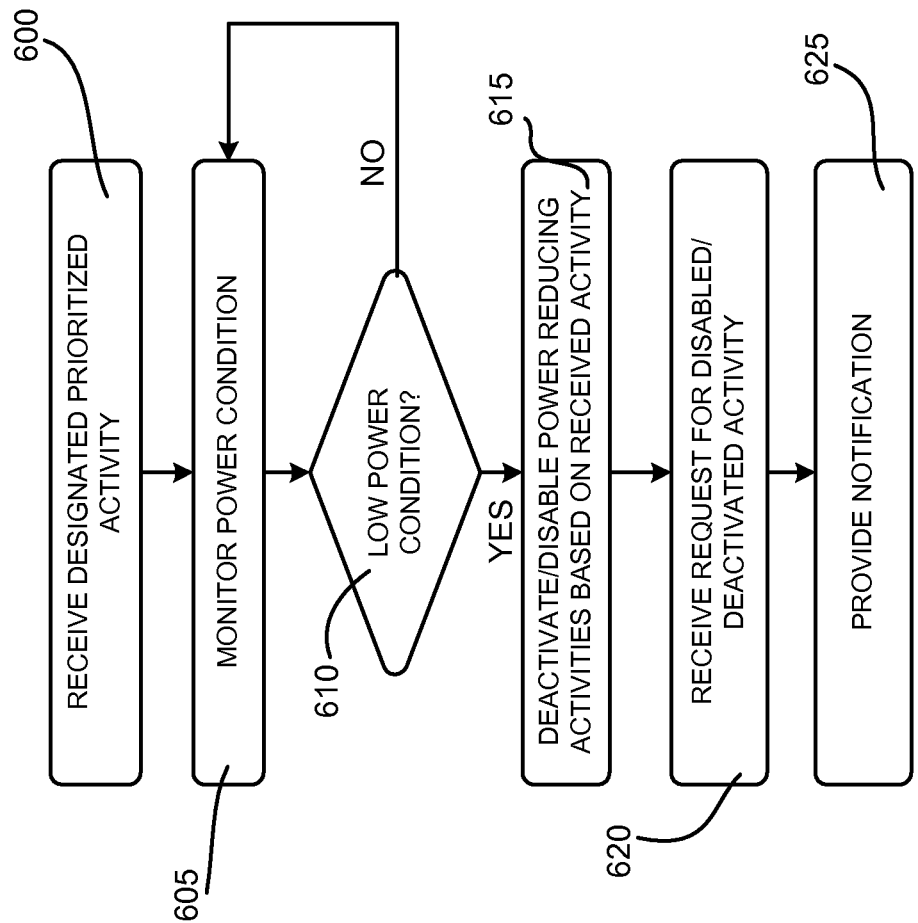
FIG. 6 is a flow diagram illustrating exemplary processing associated with providing prioritized activities in a low power condition in the user device of FIGS. 1-3.

FIG. 6 is a flow diagram illustrating exemplary processing associated with providing prioritized activities in a low power condition in user device 110. Processing may begin with device 110 receiving a designation of at least one prioritized activity or event (block 600). As described above, selection/input/identification of the prioritized activity or event may be received by activity/event prioritizing logic 410 via one or more user interfaces, such as user interface 525 and/or 560. Further, the prioritized activity or event may be included a listing (e.g., listing 545) that designates a number of activities or events in order of their priority. The prioritized events may include various activities available to users of device 110, such as telephone calls, SMS messaging, web browsing sessions, etc.

Priority enforcement logic 420 may monitor a power condition associated with user device 110 (block 605) and may determine whether user device 110 is in a first low power condition (block 610). In one implementation, determining whether user device 110 is in a first low power condition may include comparing a ratio of an amount of available power for an activity to a total amount of power (e.g., a percentage availability) to a first low power threshold. In one implementation, the first low power threshold may be approximately 10%. In alternate implementations, determining whether user device 110 is in a first low power condition may include calculating an amount of time available at current operating conditions and comparing the calculated time with a first predetermined time threshold. One exemplary predetermined time threshold may be approximately 30 minutes.

If device 110 is not in a first low power condition (block 610—NO), the process may return to block 605 for continued monitoring of the power condition. However, if device 110 is in the first low power condition (block 610—YES), power reducing activities or events may be deactivated or prohibited based on the selected prioritized activity or event (block 615). For example, a predetermined number of features or activities associated with user device 110 may be identified as power reducing activities (e.g., Bluetooth, Wi-Fi, media playback, web browsing). When it is determined that user device 110 is in the first low power condition (block 610—YES), priority enforcement logic 420 may compare the identified power reducing activities to the selected prioritized activity or event. The activities or events not included in the prioritized activity or event may be deactivated or prohibited. However, activities or events that are designated as the prioritized activity or event may be maintained for use.

In one implementation, when the selected prioritized activity or event includes more than one activity or event, power reducing activities associated with the selected prioritized activities or events may be deactivated or prohibited, as power levels in user device 110 continue to fall (e.g., to a second low power condition, a third low power condition, etc.), until only the power reducing activity associated with the highest priority remains supported by device 110.

For example, assume that user device 110 has received three prioritized activities: 1) phone call to mom, 2) phone call to dad, and 3) web browsing session. Upon initial entry of the first low power condition, all three of the prioritized activities may be supported. However, as power levels continue to fall (e.g., to a second low power condition, where sustenance of all three prioritized activities is no longer supported), the third prioritized activity (e.g., web browsing) may be prohibited and the features associated with this activity may be deactivated. As power levels continue to fall (e.g., to a third low power condition), the second prioritized activity (e.g., phone call to dad) may also be prohibited, leaving only the first prioritized activity (e.g., phone call to mom).

Following deactivation or prohibition of activities or events, user device 110 may receive a request for a prohibited activity (block 620). For example, using the example above, user device 110 may receive a request to place a phone call to John. Since this activity is not a prioritized activity or event, it is prohibited. Device 110 may notify the user that the requested activity is not available while user device 110 is in a low power mode or condition (block 625).

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to a mobile or portable device configured to provide prioritized activities in a low power condition. In other implementations, features described herein may be implemented mainly in one or more devices remote from the mobile or portable device. For example, the mobile device may be configured to receive a designation of the one or more prioritized activities from a remote network device.

Further, while series of acts have been described with respect to FIG. 6, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

While particular graphical user interfaces have been described and shown in FIGS. 5A-5E, these interfaces or screens are purely exemplary. In other embodiments, the interfaces or screens may have different, additional, or differently arranged information and graphics.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving, as a configuration setting of a device prior to entering by the device into a low power condition, a user input that identifies an activity to enable while in the low power condition,
    wherein the activity comprises a listing of two or more activities or events ranked based on a priority of each of the two or more activities or events when the device is in the low power condition;
    monitoring a power condition of the device;
    determining that the power condition is the low power condition; and
    deactivating or disabling activities other than the identified activity when the power condition is the low power condition.

2. The method of claim 1, wherein the two or more activities or events comprise at least one activity or event comprises at least two one of a telephone call, a short message service (SMS) message, a web browsing session, a media player session, a 3G network session, or a Wi-Fi network session.

3. The method of claim 2, wherein, when one of the at least two activities or events comprises a telephone call or a SMS message, the one of the at least two activities or events further designates a sender or recipient of the telephone call or the SMS message.

4. The method of claim 1, further comprising:
    deactivating or disabling activities in the listing of two or more activities or events upon continued reduction in a power level of the device, wherein the deactivating or disabling is performed based on an order the activities are ranked in the listing, with lower ranked activities or events being deactivated or disabled before higher ranked activities or events.

5. The method of claim 1, wherein monitoring a power condition further comprises determining a percentage of remaining power.

6. The method of claim 5, wherein determining that the power condition is the low power condition further comprises:
    determining whether the percentage of remaining power is less than a low power threshold.

7. A method, comprising:
    receiving, as a configuration setting of a device prior to entering by the device into a low power condition, a user input that identifies an activity to enable while in the low power condition;
    monitoring a power condition of the device;
    determining that the power condition is the low power condition; and
    deactivating or disabling activities other than the identified activity when the power condition is the low power condition,
    wherein deactivating or disabling activities other than the identified activity when the power condition is the low power condition further comprises:
        identifying a set of power reducing activities;
        determining whether any of the set of power reducing activities are included in the identified activity;
        disabling the activities included in the set of power reducing activities when any of one of the set of power reducing activities are not included in the identified activity; and
        disabling activities included in the set of power reducing activities other than the one of the set of power reducing activities included in the identified activity when any one of the set of power reducing activities is included in the identified activity.

8. The method of claim 7, wherein the set of power reducing activities comprises a listing of activities or functions of the device that reduce power in the device.

9. A device, comprising:
    an output device to provide information to a user; and a processor configured to:
receive input from the user that identifies an activity to enable while in a low power condition,
wherein the input that identifies the activity to enable while in the low power condition is received before an attempt to execute the activity and before the device is in the low power condition;
monitor a power condition of the device;
determine that the power condition is the low power condition;
deactivate or disable activities other than the identified activity when the power condition is the low power condition;
receive a request for a disabled or deactivated activity; and
provide a notification, to the user via the output device, that the requested activity is not available.

10. The device of claim 9, wherein the identified activity comprises at least one of a telephone call, a short message service (SMS) text message, a web browsing session, a media player session, a 3G network session, or a Wi-Fi network session.

11. The device of claim 9, wherein the identified activity comprises a ranked listing of two or more activities or events, wherein the two or more activities or events are ranked based on priority of each of the two or more activities or events when the device is in the low power condition.

12. The device of claim 9, wherein the processor to deactivate or disable activities other than the received activity when the power condition is the low power condition further comprises a processor configured to:
identify a set of power reducing activities;
determine whether any of one of the set of power reducing activities are included in the received activity;
disable the activities included in the set of power reducing activities when any of one of the set of power reducing activities are not included in the received activity; and
disable activities included in the set of power reducing activities other than the one of the set of power reducing activities included in the received activity when any one of the set of power reducing activities is included in the received activity.

13. The device of claim 11, wherein the processor is further configured to:
determine that the power condition is a second low power condition; and
deactivate or disable one or more activities or events included in the ranked listing based on a relative ranking of the activities or events in the ranked listing when the power condition is the second low power condition.

14. The device of claim 13, wherein the second low power condition exists when there is insufficient power to support all activities or events included in the ranked listing.

15. A computer-readable medium having stored thereon sequences of instructions which, when executed by at least one processor, cause the at least one processor to:
receive, as a configuration setting of a device prior to entering by the device into a low power condition, an identification of a low power activity from a user,
wherein the low power activity comprises a listing of two or more activities or events ranked based on a priority of each of the two or more activities or events when the device is in the low power condition;
monitor a power condition of the device;
determine that the power condition is the low power condition;
deactivating or disabling activities other than an identified low power activity when the power condition is the low power condition.

16. The computer-readable medium of claim 15, further including instructions for causing the at least one processor to:
receive the identification of the low power activity from the user via a configuration settings user interface associated with the device.

17. The computer-readable medium of claim 15, further including instructions for causing the at least one processor to:
receive the identification of the low power activity from a remote device via a network interface.

18. The computer-readable medium of claim 15, wherein the instructions which, when executed by at least one processor, further cause the at least one processor to:
deactivate or disable activities in the listing of two or more activities or events upon continued reduction in a power level of the device, wherein the deactivating or disabling is performed based on an order the activities are ranked in the listing, with lower ranked activities or events being deactivated or disabled before higher ranked activities or events.

19. The computer-readable medium of claim 15, wherein the instructions cause the at least one processor to deactivate or disable activities other than the identified activity when the power condition is the low power condition further cause the at least one processor to:
identify a set of power reducing activities;
determine whether any of the set of power reducing activities are included in the identified activity;
disable the activities included in the set of power reducing activities when any of one of the set of power reducing activities are not included in the identified activity; and
disable activities included in the set of power reducing activities other than the one of the set of power reducing activities included in the identified activity when any one of the set of power reducing activities is included in the identified activity.

20. The computer-readable medium of claim 15, wherein the instructions which, when executed by at least one processor, further cause the at least one processor to:
determine that the power condition is a second low power condition indicating that there is insufficient power to support all activities or events included in the ranked listing; and
deactivate or disable one or more activities or events included in the ranked listing based on a relative ranking of the activities or events in the ranked listing when the power condition is the second low power condition.

* * * * *